May 15, 1923.

D. F. FESLER

LUBRICATING DEVICE

Original Filed Nov. 18, 1918

1,454,922

Inventor:
Douglas F. Fesler
Williams Bradbury
See & McCabe  Attys

Patented May 15, 1923.

1,454,922

UNITED STATES PATENT OFFICE.

DOUGLAS F. FESLER, OF CHICAGO, ILLINOIS, ASSIGNOR TO THE BASSICK MANUFACTURING COMPANY, OF CHICAGO, ILLINOIS, A CORPORATION OF DELAWARE.

LUBRICATING DEVICE.

Original application filed November 18, 1918, Serial No. 262,930. Divided and this application filed May 28, 1920. Serial No. 384,931.

*To all whom it may concern:*

Be it known that I, DOUGLAS F. FESLER, a citizen of the United States, residing at Chicago, in the county of Cook and State of Illinois, have invented a certain new and useful Improvement in Lubricating Devices, of which the following is a full, clear, concise, and exact description, reference being had to the accompanying drawings, forming a part of this specification.

My invention relates to improvements in a lubricating device, and is especially concerned with means for supplying lubricant under pressure to bearings or other surfaces to be lubricated. My invention comprises means whereby lubricant under high pressure can be initially supplied to the surfaces to be lubricated and other means for thereafter supplying lubricant to said surfaces at a considerably reduced pressure.

The objects of my invention are:

1st. To provide apparatus for performing the above functions, comprising in general a grease cup having a plunger therein, a spring confined between one end of the grease cup and the plunger, means for supplying lubricant under pressure to the space between the other side of the plunger and the opposite end of the grease cup, and means for conducting lubricant from said space to the bearing or surface to be lubricated, the means for supplying lubricant to said space under pressure comprising a grease gun or compressor, such as that disclosed in my co-pending application, Serial No. 262,930, filed November 18, 1918, of which this application constitutes a division, and which comprises a discharge nozzle and means for detachably connecting the discharge nozzle of the grease gun with the grease cup.

2nd. To provide a system of the character described, in which means is provided for supporting the plunger against the pressure of the lubricant when the grease cup is completely filled by lubricant under pressure, so that additional pressure can be exerted upon the lubricant in order to force it into the bearing with which the grease cup is connected under an extremely high pressure, whereby a supply of lubricant is insured to every point of contact of the bearing.

3rd. To provide a grease cup of novel construction forming a part of the above-described system which is simple in construction and economical to manufacture; and 4th. To provide a grease cup of the type described having means for indicating the amount of lubricant which it contains.

Other objects will appear as this description progresses, reference being had to the accompanying drawings, in which—

In both figures of the drawing, similar reference characters will be used for referring to similar parts.

Figure 1:
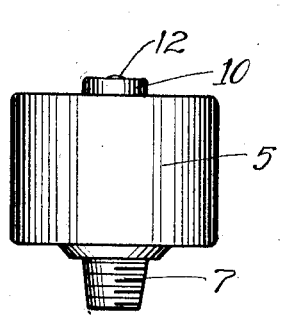
Figure 1 is a side elevation of my improved lubricating device.
Figure 2:
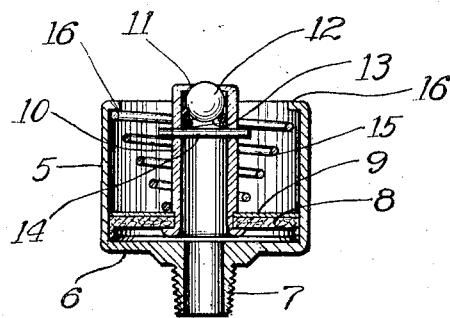
Figure 2 is a central longitudinal section therethrough.

My improved lubricating device comprises a cylindrical receptacle 5 having an end closure 6 formed integrally therewith and provided with a screw-threaded tubular extension or conduit 7 for attaching the device to a bearing to be lubricated and for establishing communication between the bearing and the interior of the receptacle. A plunger comprising the cup leather 8 and the follower plate 9 is slidably mounted in the receptacle and provided with a central opening for receiving the reduced lower end of the tubular member 10, the lower end of the tubular member being swaged over upon the cup leather, as shown in Figure 2. The outer end of the tubular member is flanged over, as shown at 11, to provide a seat for the closure 12 which is yieldingly held in closed position by a spring 13, the inner end of which rests upon the pin 14.

The ends of the pin 14 project beyond the side walls of the tubular member 10 and form means for establishing a detachable connection with the discharge conduit of a lubricant compressor in the manner illustrated in my co-pending application above referred to. A spiral spring 15 is confined between the follower 9 and the inturned portions 16 of the end of the receptacle opposite the end closure 6, and tends to force the plunger 8 toward the end closure 6.

In operation the discharge conduit of a lubricant compressor is connected with the tubular member 10 in the manner shown in my co-pending application, above referred to, and the compressor actuated to subject the lubricant therein to pressure, whereupon the lubricant flows through the discharge conduit past the closure 12, which is opened by the pressure of the lubricant, and into the tubular member 10. The tension of the spring 15 is made such that upon continued application of pressure to the lubricant it will cause the plunger to be raised until all the convolutions of the spring 9 are forced into a common plane when the outward movement of the plunger will be arrested. If the pressure upon the lubricant is then increased, it will be forced between the surfaces to be lubricated, thereby dislodging all of the old lubricant and flushing the bearing with new lubricant. When such lubricant has been thus supplied to the bearing, the compressor is detached from the member 10, whereupon the spring 15 will exert a continuous pressure upon the lubricant and thus provide a constant supply of lubricant to the bearing.

The extent to which the tubular member 10 projects beyond the upper end of the receptacle 5 will indicate the amount of lubricant which the receptacle contains.

While I have used the words "upper" and "lower" throughout the above description in defining the relation of certain parts of my improved device, it is to be clearly understood that these details are merely relative and are not to be taken in their absolute sense.

While I have described the details of the preferred embodiment of my invention, it is to be clearly understood that my invention is not limited to these details of construction, but is capable of other adaptations and modifications within the scope of the appended claims.

Having thus described my invention, what I claim is:

1. The combination with a receptacle having an end closure provided with a conduit for securing it to a bearing, of a plunger slidable in said receptacle, a tubular member extending through and secured to said plunger in alignment with said conduit, the outer end of said tubular member being provided with an outwardly closing closure and means for making a detachable connection with a grease gun, and a spring for urging said plunger toward said end closure.

2. The combination with a receptacle having one open end and an end closure at its other end provided with a conduit for securing it to a bearing, of a perforated plunger slidable in said receptacle, a tubular member extending through said open end and secured to said plunger in alignment with the perforation in said plunger; the outer end of said tubular member being provided with an outwardly closing closure and means for making a detachable connection with a grease gun, said outer end being spaced from said receptacle to provide room for making said detachable connection and a spring for urging said plunger toward said end closure.

In witness whereof, I hereunto subscribe my name this 21st day of May, 1920.

DOUGLAS F. FESLER.

Witnesses:
  ALBIN C. AHLBERG,
  ANDREW WINTERCORN.